United States Patent [19]

Radtke et al.

[11] Patent Number: 4,861,898
[45] Date of Patent: Aug. 29, 1989

[54] ISOINDOLINE METAL COMPLEXES

[75] Inventors: Volker Radtke, Hassloch; Heinrich Kowarsch, Oberderdingen; Erwin Hahn, Heidelberg, all of Fed. Rep. of Germany

[73] Assignee: BASF Aktiengesellschaft, Ludwigshafen, Fed. Rep. of Germany

[21] Appl. No.: 130,653

[22] Filed: Dec. 9, 1987

[30] Foreign Application Priority Data

Dec. 16, 1986 [DE] Fed. Rep. of Germany ....... 3642856

[51] Int. Cl.$^4$ .................. C07F 15/04; C07F 15/06; C07F 3/06; C07F 1/08
[52] U.S. Cl. .................................................. 548/402
[58] Field of Search ........................................ 548/402

[56] References Cited

U.S. PATENT DOCUMENTS 4,191,566 3/1980 Jeanneret ............................... 430/37

FOREIGN PATENT DOCUMENTS 3537625 4/1987 Fed. Rep. of Germany ...... 548/402

OTHER PUBLICATIONS

Venkataramen, Chem. Synthetic Dyes, vol. VII (1974), p. 59.
General Chemistry, 3rd Ed., 528-529, Pauling.

Primary Examiner—Mark L. Berch
Attorney, Agent, or Firm—Oblon, Spivak, McClelland, Maier & Neustadt

[57] ABSTRACT

Isoindoline metal complexes of the formula I

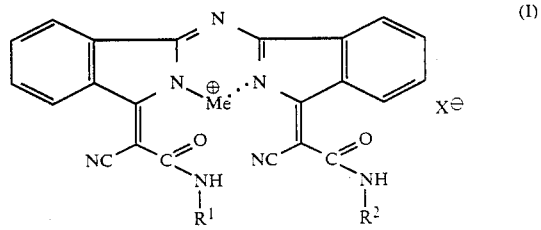

wherein $R^1$ and $R^2$ are independently of each other H or $C_1$–$C_4$-alkyl, $X^\ominus$ is one equivalent of a colorless anion and Me is $Zn^{2+}$, $Ni^{2+}$, $Co^{2+}$ or $Cu^{2+}$, are suitable for pigmenting surface coatings, plastics and printing inks.

14 Claims, No Drawings

ISOINDOLINE METAL COMPLEXES

U.S. Pat. No. 4,191,566 describes the reaction of condensation products of 2-cyanomethylbenzimidazole or 2-aminobenzimidazole and 1-amino-3-iminoisoindoline with anhydrous nickel acetate in the presence of diethylene glycol monoethyl ether at 140°–145° C. to give black complexes of the formula (II)

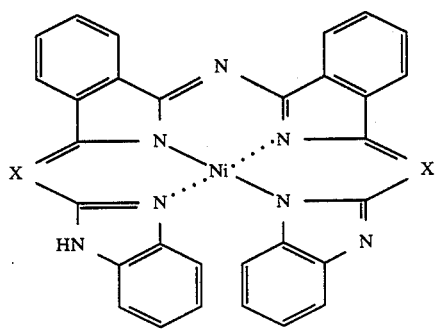
(II)

where both the X's are =N— or

The compounds are intended for use in electrophotographic systems. On account of their hue these metal complexes are of no interest for coloristic uses.

The present invention relates to an isoindoline metal complex of the formula (I)

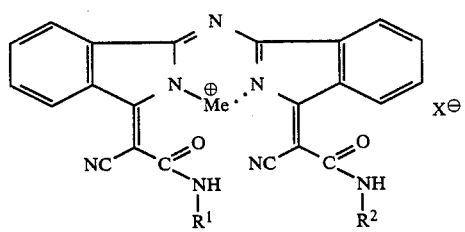
(I)

where $R^1$ and $R^2$ are independently of each other H or $C_1$–$C_4$-alkyl, $X^\ominus$ is one equivalent of an anion and Me is $Zn^{2+}$, $Ni^{2+}$, $Co^{2+}$ or $Cu^{2+}$.

Depending on the metal atom, the complex (I) produces in surface coatings, plastics and printing inks a brilliant red, bluish violet or brown color of good to very good fastnesses.

For instances, the zinc complex of (I) where $R^1=R^2=H$ and $X^\ominus=Cl^\ominus$ is appreciably superior in nitrocellulose-containing printing inks to C.I. Pigment Red 53:1 (C.I. 15,585:1) in gloss, color strength and light fastness.

In (I), $R^1$ and $R^2$ are independently of each other H or $C_1$–$C_4$-alkyl. $R^1$ and $R^2$ are each preferably hydrogen or methyl. Of the metal ions mentioned, preference is given to $Zn^{2\oplus}$, which is why the corresponding complexes (I) are likewise preferred. Examples of anions $X^\ominus$ are $Cl^\ominus$, $Br^\ominus$, $I^\ominus$, acetate$^\ominus$, $\frac{1}{2}$ $SO_4^{2\ominus}$ and $NO_3^\ominus$, of which $Cl^\ominus$ and $Br^\ominus$ are preferred.

On account of the particularly good application properties, the complexes (I) where $R^1$ and $R^2$ are each H or $CH_3$, Me is $Zn^\oplus$ and $X^\ominus$ is $Cl^\oplus$ are particularly preferred.

The novel metal complexes of the formula (I) are obtained by reacting 2 moles of the compound of the formula (III)

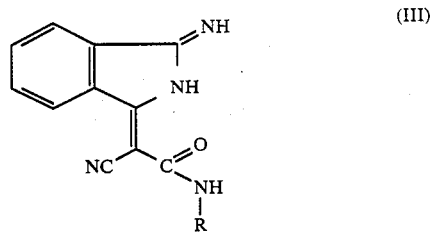
(III)

in 3 to 5 times the amount by weight of anhydrous N,N-dimethylformamide (DMF), N-methylpyrrolidone (NMP) or a mixture of DMF and/or NMP and $C_2$–$C_5$-alkanoic acids with 1 mole of an anhydrous metal salt of the metal ion in question at from 50° to 150° C. The metal complexes usually even precipitate while still hot and can be isolated in a pure form by filtering off and washing with organic solvents.

The complexes (I) where Me=$Cu^{2\oplus}$, $Ni^{2\oplus}$ or $Co^{2\oplus}$ can also be obtained by reacting the zinc complex (I) with salts of Cu, Ni or Co in alkanoic acids or mixtures of alkanoic acids and DMF and/or NMP. Preferably, this metal ion exchange takes place in anhydrous acetic acid. The complexes can be directly used as pigments in the form in which they are obtained in the synthesis.

The pigment properties of the complexes can additionally be changed in a conventional manner and thus optimized for certain applications. This objective can be achieved for example by grinding the crude pigments, which converts the pigments into a finely divided form, and, if appropriate, by aftertreatment in suitable organic solvents. By varying the solvent and/or the temperature, the pigmentary form can be affected, such that strong, transparent to high-hiding pigments are obtained.

The complexes (I) are pigments which are highly suitable for coloring plastics (mass coloration), surface coatings and in particular inks for paper, textile or sheet metal printing.

The invention is additionally illustrated by the Examples which follow. Parts and percentages are by weight.

EXAMPLE 1a 170 parts of the iminoisoindoline of the formula (III) R=H (0.8 mol) and 60 parts of anhydrous $ZnCl_2$ (0.44 mol) are stirred in 700 parts of anhydrous DMF at 100° C. for one hour, during which the change in color from yellow to red indicates the progressive formation of the complex. Cooling down to room temperature is followed by filtering with suction and washing with DMF and then with hot water. Drying leaves 166 parts (=81% of theory) of a yellowish red pigment of the formula (I) where $R^1=R^2=H$; $X^\ominus=Cl^\ominus$; Me=$Zn^{2+}$.

m.p.: >340° C.

Analysis: $C_{22}H_{12}N_7O_2ZnCl$ calc.: C, 52.0%, H, 2.3%, N, 19.3%, O, 6.3%, Cl, 6.9%, Zn, 12.8%; found: C, 52.0%, H, 2.5%, N, 19.2%, O, 6.9%, Cl, 6.6%, Zn, 12.3%.

EXAMPLE 1b

A strong, more transparent pigmentary form is obtained by ball milling the crude pigment obtained under 1a for 5 hours and then stirring the mill base in five times the weight of glacial acetic acid at 110° C. for 4 hours.

EXAMPLE 2

A mixture of 150 parts of DMF, 150 parts of glacial acetic acid and 90 parts of iminoisoindoline(III) where R=CH₃ (0.4 mol) is heated to 60° C. Four portions of 54 parts of anhydrous ZnBr₂ (0.24 mol) are added with stirring. This is followed by stirring at 90° C. for 2 hours, filtration, washing with glacial acetic acid and water and drying. Yield: 91 parts (=85% of theory) of a neutral red pigment of the formula (I) where $R^1=R^2=CH_3$; $Me=Zn^{2\oplus}$ and $X^\ominus=Br^\ominus$.

m.p.; >340° C.

Analysis: Zn calc.: 11.3%; Zn found: 11.0%.

EXAMPLE 3

Example 1 is repeated, except that the ZnCl₂ is replaced by CuSO₄. Yield: 201 parts of a reddish brown pigment of the formula (I) where $R^1=R^2=H$; $Me=Cu^{2+}$ and $X=\frac{1}{2} SO_4^{2\ominus}$.

Analysis: Cu calc.: 12.2%; Cu found: 12.1%.

EXAMPLE 4 (transmetallization)

96 parts of the zinc complex obtained as described in Example 1a are heated together with 40 parts of anhydrous nickel acetate and 900 parts of glacial acetic acid at 110° C. for 3 hours. Filtering off with suction and drying leaves 88 parts (=89%) of a reddish violet pigment of the formula (I) where $R^1=R^2=H$; $Me=Ni^{2\oplus}$ and $X^\ominus$=acetate.

m.p.: >340° C.

Analysis: Ni calc.: 11.2%; Ni found: 10.9%.

EXAMPLE 5 (anion exchange)

10 parts of the complex obtained as described in 1a are stirred in an aqueous solution of 3.4 parts of silver nitrate at 60° C. for 3 hours. The powder is filtered off with suction, washed first with dilute ammonia and then with water and dried. Yield: 9 parts of a yellowish red complex of the formula (I) where $R^1=R^2=H$; $Me=Zn^{2\oplus}$ and $X^\ominus=NO_3^\ominus$.

m.p.: 22 340° C.

EXAMPLE 6

Example 2 is repeated, except that the ZnBr₂ is replaced by an equimolar amount of NiCl₂. The complex (I) obtained, where $R^1=R^2=CH_3$, $Me=Ni^{2\oplus}$, and $X^\ominus=Cl^\ominus$, produces bluish violet colors in surface coatings.

m.p.: >340° C.

Analysis: Ni calc.: 11.1%; Ni found: 10.8%.

EXAMPLES 7 TO 10

Example 1a is repeated to prepare complexes of the formula (I). The meanings of $R^1$, $R^2$, Me and $X^\ominus$ are stated in the table below. The right-hand column indicates the hues obtained in surface coatings.

| Example | $R^1 = R^1$ | Me | $X^\ominus$ | Hue | m.p.: |
|---|---|---|---|---|---|
| 7 | CH₃ | $Zn^{2\oplus}$ | $Cl^\ominus$ | red | >340° C. |
| 8 | H | $Zn^{2\oplus}$ | $Br^\ominus$ | yellowish red | >340° C. |
| 9 | CH₃ | $Cu^{2\oplus}$ | $\frac{1}{2} SO_4^{2\ominus}$ | reddish brown | >340° C. |
| 10 | H | $Co^{2\oplus}$ | $Cl^\ominus$ | reddish violet | >340° C. |

APPLICATION EXAMPLE 1 (surface coating)

10 parts of the pigment obtained as described in Example 4 and 95 parts of a baking finish mix which contains 70% of coconut alkyd resins (in 60% strength solution in xylene) and 30% of melamine resin (in approximately 55% strength solution in butanol/xylene) are milled in an attritor. Application, flashoff and baking (30 minutes at 120° C.) produces a reddish black plain coating of good light and overspray fastness. Mixing in titanium dioxide gives reddish violet white reduction colors having good light, overspray and migration fastnesses.

If the pigments described in Examples 1 to 3 and 5 to 10 are used, the coatings obtained range in hue from yellowish red to bluish violet or brown and have similar application properties.

APPLICATION EXAMPLE 2 (plastic)

0.5 part of the pigment that is obtained as described in Example 2 is drummed onto 100 parts of polystyrene granules (standard grade). The colored granules are homogenized by extruding (190° to 195° C.) to give red extrudates of good light fastness.

Using mixtures of 0.5 part of the abovementioned pigment and 1 part of titanium dioxide likewise produces red colors.

APPLICATION EXAMPLE 3 (printing ink)

12 parts of the pigment obtained are described in Example 1b and 126 parts of a nitrocellulose solution (17.6 parts of nitrocellulose and 4.4 parts of dibutyl phthalate in 25.2 parts of ethyl acetate and 78.8 parts of ethanol) are intimately mixed in a dispersing apparatus to give an NC gravure printing ink which produces strong red prints of very good light fastness.

We claim:

1. An isoindoline metal complex of the formula I

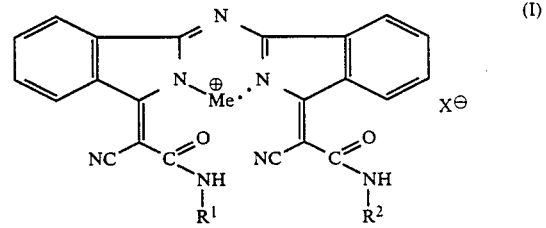

where $R^1$ and $R^2$ are independently of each other H or $C_1-C_4$-alkyl, $X^\ominus$ is one equivalent of a colorless anion and Me is $Zn^{2+}$, $Ni^{2+}$, $Co^{2+}$ or $Cu^{2+}$.

2. A metal complex as claimed in claim 1, wherein $R^1$ and $R^2$ are independently of each other H or CH₃.

3. A metal complex as claimed in claim 1, wherein Me is $Zn^{2+}$.

4. A metal complex as claimed in claim 2, wherein Me is $Zn^{2+}$.

5. A metal complex as claimed in claim 1, wherein $X^\ominus$ is $Cl^\ominus$, $Br^\ominus$, $I^\ominus$, $\frac{1}{2}SO_4^{2\ominus}$, acetate$^\ominus$ or $NO_3^\ominus$.

6. A metal complex as claimed in claim 2, wherein $X^\ominus$ is $Cl^\ominus$, $Br^\ominus$, $I^\ominus$, $\frac{1}{2}SO_4^{2\ominus}$, acetate$^\ominus$ or $NO_3^\ominus$.

7. A metal complex as claimed in claim 3, wherein $X^\ominus$ is $Cl^\ominus$, $Br^\ominus$, $I^\ominus$, $\frac{1}{2}SO_4^{2\ominus}$, acetate$^\ominus$ or $NO_3^\ominus$.

8. A metal complex as claimed in claim 4, wherein $X^\ominus$ is $Cl^\ominus$, $Br^\ominus$, $I^\ominus$, $\frac{1}{2}SO_4^{2\ominus}$, acetate$^\ominus$ or $NO_3^\ominus$.

9. A metal complex as claimed in claim 1, wherein $X^\ominus$ is $Cl^\ominus$ or $Br^\ominus$.

10. A metal complex as claimed in claim 2, wherein $X^\ominus$ is $Cl^\ominus$ or $Br^\ominus$.

11. A metal complex as claimed in claim 3, wherein $X^\ominus$ is $Cl^\ominus$ or $Br^\ominus$.

12. A metal complex as claimed in claim 4, wherein $X^\ominus$ is $Cl^\ominus$ or $Br^\ominus$.

13. An isoindoline metal complex of the formula I

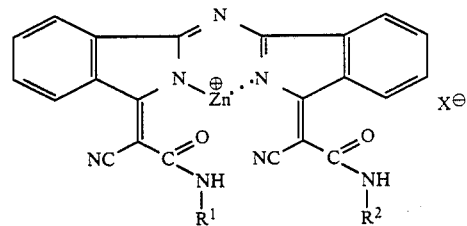

where $R^1$ and $R^2$ are each H or methyl and $X^\ominus$ is $Cl^\ominus$ or $Br^\ominus$.

14. An isoindoline metal complex as claimed in claim 13, wherein $X^\ominus$ is $Cl^\ominus$.

* * * * *